United States Patent
Hay

(10) Patent No.: US 10,711,590 B2
(45) Date of Patent: Jul. 14, 2020

(54) VISUALIZATION OF LOOK-AHEAD SENSOR DATA FOR WELLBORE DRILLING TOOLS

(71) Applicant: Halliburton Energy Services, Inc., Houston, TX (US)

(72) Inventor: Richard Thomas Hay, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 481 days.

(21) Appl. No.: 15/531,371

(22) PCT Filed: Dec. 31, 2014

(86) PCT No.: PCT/US2014/073073
§ 371 (c)(1),
(2) Date: May 26, 2017

(87) PCT Pub. No.: WO2016/108915
PCT Pub. Date: Jul. 7, 2016

(65) Prior Publication Data
US 2017/0342815 A1 Nov. 30, 2017

(51) Int. Cl.
*E21B 47/024* (2006.01)
*E21B 44/00* (2006.01)
(Continued)

(52) U.S. Cl.
CPC ............ *E21B 44/005* (2013.01); *E21B 10/00* (2013.01); *E21B 10/43* (2013.01); *E21B 44/00* (2013.01);
(Continued)

(58) Field of Classification Search
CPC ........ E21B 47/024; E21B 44/00; E21B 47/12; E21B 47/0002; E21B 47/00; G01V 11/00; G01V 1/34
See application file for complete search history.

(56) References Cited

U.S. PATENT DOCUMENTS

| 5,475,309 A | 12/1995 | Hong et al. |
| 6,078,867 A | 6/2000 | Plumb et al. |

(Continued)

FOREIGN PATENT DOCUMENTS

| CN | 102918228 A | 2/2013 |
| GB | 2444375 B | 3/2009 |

(Continued)

OTHER PUBLICATIONS

International Search Report and Written Opinion issued in related PCT Application No. PCT/US2014/073073 dated Sep. 14, 2015, 23 pages.

(Continued)

*Primary Examiner* — Mohamed Charioui
*Assistant Examiner* — Christine Y Liao
(74) *Attorney, Agent, or Firm* — Jason Sedano; Baker Botts L.L.P.

(57) ABSTRACT

Systems and methods for visualizing data from radially-oriented look-ahead sensors coupled to a drill bit are disclosed herein. A system comprises a processor, a memory, and a data analysis module. The data analysis module is operable to receive formation information from each of a plurality of formation sensors coupled to a downhole drilling system, the formation information being associated with one or more properties of a formation at a depth in front of the downhole drilling system, receive angular information from one or more orientation sensors coupled to the downhole drilling system, the angular information being associated with the formation information, compile sensor data based on the formation information and the angular information, and generate a visualization based on the sensor data.

90 Claims, 7 Drawing Sheets

(51) Int. Cl.
    *E21B 47/01*     (2012.01)
    *E21B 10/00*     (2006.01)
    *G01V 5/06*     (2006.01)
    *E21B 10/43*     (2006.01)
    *G06F 3/14*     (2006.01)
    *G06F 16/00*     (2019.01)

(52) U.S. Cl.
    CPC ............. *E21B 47/011* (2013.01); *G01V 5/06* (2013.01); *G06F 3/14* (2013.01); *G06F 16/00* (2019.01)

(56) References Cited

U.S. PATENT DOCUMENTS

| | | |
|---|---|---|
| 6,584,837 B2 | 7/2003 | Kurkoski |
| 7,000,700 B2 | 2/2006 | Cairnes et al. |
| 7,340,347 B2 | 3/2008 | Shray et al. |
| 7,366,616 B2 | 4/2008 | Bennett et al. |
| 7,432,500 B2 | 10/2008 | Sale |
| 7,596,481 B2 | 9/2009 | Zamora et al. |
| 7,630,872 B2 | 12/2009 | Xia et al. |
| 8,271,199 B2 | 9/2012 | Wang |
| 8,489,375 B2 | 7/2013 | Omeragic et al. |
| 2004/0222019 A1* | 11/2004 | Estes ............... E21B 44/00 175/45 |
| 2005/0194182 A1* | 9/2005 | Rodney ............ E21B 47/12 175/24 |
| 2006/0149477 A1 | 7/2006 | Cairns et al. |
| 2007/0236222 A1 | 10/2007 | Gorek et al. |
| 2008/0078242 A1* | 4/2008 | Hassan ............ E21B 47/08 73/152.29 |
| 2009/0030616 A1* | 1/2009 | Sugiura ........... G01V 11/00 702/9 |
| 2011/0057656 A1 | 3/2011 | Tchakarov et al. |
| 2011/0229071 A1* | 9/2011 | Vincelette ........ E21B 43/2406 385/13 |
| 2011/0253448 A1* | 10/2011 | Trinh ............... E21B 47/026 175/50 |
| 2012/0147006 A1* | 6/2012 | Rothnemer ...... E21B 44/00 345/424 |
| 2012/0272724 A1 | 11/2012 | Hollmann et al. |
| 2013/0069657 A1 | 3/2013 | Lindqvist et al. |
| 2013/0282289 A1 | 10/2013 | Lotfy et al. |
| 2014/0224539 A1* | 8/2014 | Kumar ............ E21B 10/08 175/50 |

FOREIGN PATENT DOCUMENTS

| | | |
|---|---|---|
| GB | 2490279 B | 3/2013 |
| WO | 2010/045171 A2 | 4/2010 |
| WO | 2010/132927 A1 | 11/2010 |
| WO | 2011/080640 A2 | 7/2011 |

OTHER PUBLICATIONS

International Preliminary Report on Patentability issued in related Application No. PCT/US2014/073073, dated Jul. 13, 2017 (18 pages).

Chinese Office Action and Search Report issued in related Chinese Patent Application No. 201480083202.5, dated Jul. 2, 2018, 10 pages (no translation.).

* cited by examiner

VISUALIZATION OF LOOK-AHEAD SENSOR DATA FOR WELLBORE DRILLING TOOLS

CROSS-REFERENCE TO RELATED APPLICATION

The present application is a U.S. National Stage Application of International Application No. PCT/US2014/073073 filed Dec. 31, 2014, which is incorporated herein by reference in its entirety for all purposes.

BACKGROUND

The present disclosure relates generally to well drilling and hydrocarbon recovery operations and, more particularly, to a system and method of visualizing data from formation sensors configured to sense formation properties in front of a drill bit of a downhole drilling system.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Measurements of the subterranean formation may be made through the use of radially-oriented downhole sensors to characterize the formation and aide in making operational decisions. Example sensors include antennas and gamma ray detectors. In certain drilling systems, it may be useful to determine characteristics of a portion of the subterranean formation before that portion is reached by the drilling system. These determinations typically utilize "look ahead" measurements in front of the drilling system. However, interpreting data from these radially-oriented sensors may be difficult.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

The present disclosure describes a system and method of visualizing data from radially-oriented formation sensors coupled to a drill bit in a downhole drilling system. The sensors may be coupled to any suitable drill bit, such as a roller cone drill bit or a fixed cutter drill bit, in a radius from the center of the drill bit. The radially-oriented sensors may be biased to measure mostly the formation at the face of the drill bit or ahead of the drill bit, and may collect data associated with properties of the formation being drilled, such as gamma ray radiation, formation resistivity, or the like. Data from the sensors may be collected and associated with the angle at which the data was collected. Data from each of the sensors of the drill bit may then be compiled into memory bins based on the associated angles at which the data was collected. The data may then be visualized and displayed in a manner that is meaningful to an operator of the downhole drilling system or to an automated steering system, such that drilling decisions such as wellbore steering may be made accordingly. For example, the data may be visualized with respect to an estimated formation composition in some embodiments. The visualization may be in two or three dimensions in certain embodiments. In particular embodiments, the visualization may be animated, showing the changes in the formation sensor data over time as the wellbore is being drilled.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 6, where like numbers are used to indicate like and corresponding parts.

Figure 1:
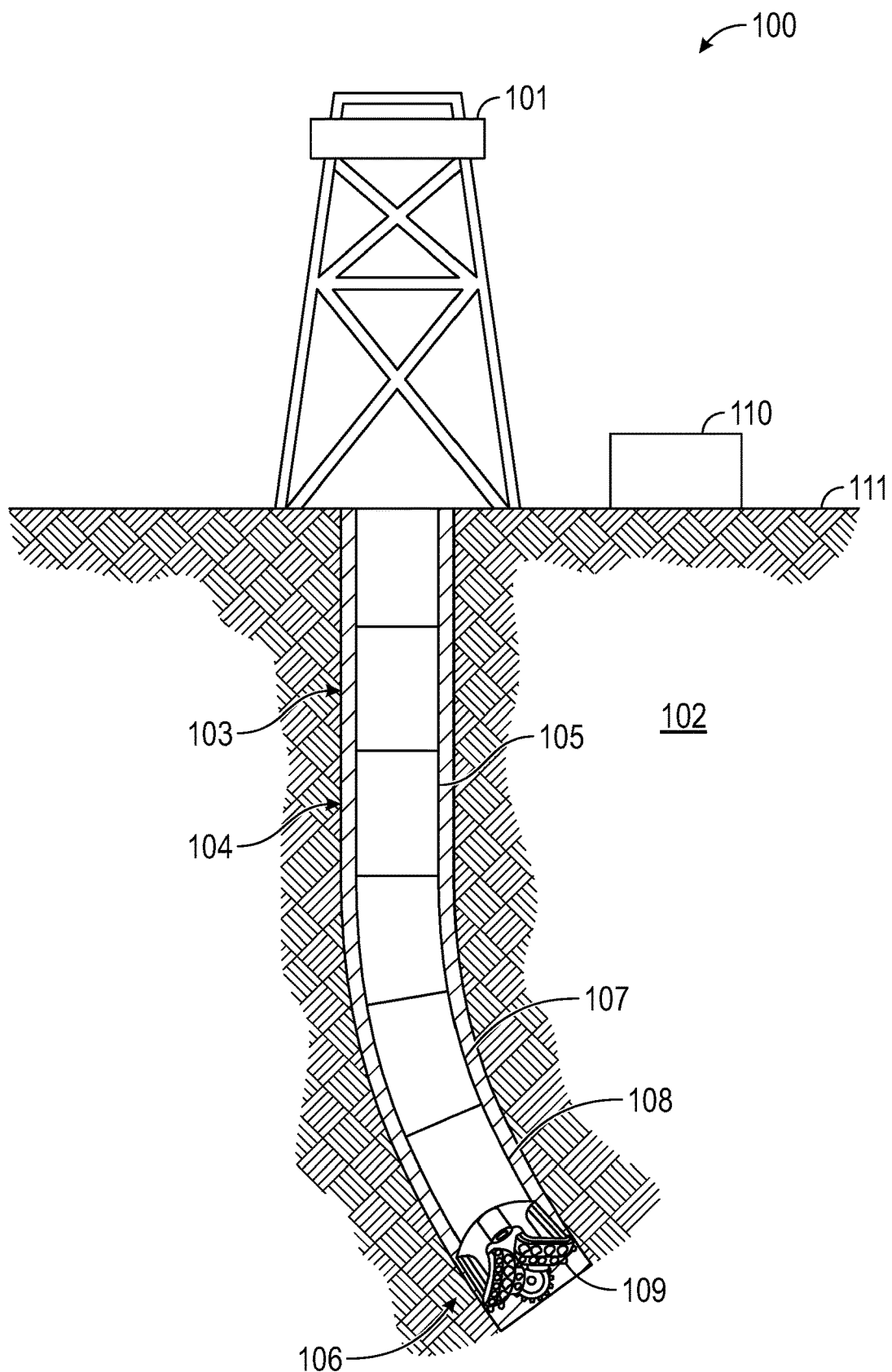
FIG. 1 illustrates an example downhole drilling system, in accordance with embodiments of the present disclosure.

FIG. 1 illustrates an example downhole drilling system 100, in accordance with embodiments of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. In other embodiments, the drilling assembly 104 may be coupled to the rig 101 using a wireline or a slickline, for example. The drilling assembly 104 may include a bottom hole assembly (BHA) 106. The BHA 106 may include a drill bit 109, a steering assembly 108, and a LWD/MWD apparatus 107. A control unit 110 located at the surface 111 may include a processor and memory device (e.g., computing device 200 of FIG. 2), and may communicate with elements of the BHA 106, in the LWD/MWD apparatus 107, and the steering assembly 108. The control unit 110 may receive data from and send control signals to the BHA 106. Additionally, at least one processor and memory device may be located downhole within the BHA 106 for the same purposes. The LWD/MWD apparatus 107 may log the formation 102 both while the wellbore 103 is being drilled, and after the wellbore is drilled to provide information regarding ongoing subterranean operations. For example, LWD/MWD apparatus may log data from radially-oriented sensors on drill bit 109 or determine one or more characteristics of formation 102 (e.g., formation resistivity, hardness, and/or type) during drilling operations. The steering assembly 108 may include a mud motor that provides power to the drill bit 109, and that is rotated along with the drill bit 109 during drilling operations. The mud motor may be a positive displacement drilling motor that uses the hydraulic power of the drilling fluid to drive the drill bit 109. In accordance with an embodiment of the present disclosure, the BHA 106 may include an optionally non-rotatable portion. The optionally non-rotatable portion of the BHA 106 may include any of the components of the BHA 106 excluding the mud motor and the drill bit 109. For instance, the optionally non-rotatable portion may include a drill collar, the LWD/MWD apparatus 107, bit sub, stabilizers, jarring devices and crossovers. In certain embodiments, the steering assembly 108 may angle the drill bit 109 to drill at an angle from the wellbore 103. Maintaining the axial position of the drill bit 109 relative to the wellbore 103 may require knowledge of the rotational position of the drill bit 109 relative to the wellbore 103.

Modifications, additions, or omissions may be made to FIG. 1 without departing from the scope of the present disclosure. For example, FIG. 1 illustrates components of drilling system 100 in a particular configuration. However, any suitable configuration of drilling components for drilling a hydrocarbon well may be used. Furthermore, it will be understood that various types of drill bits 109, such as roller cone bits or fixed cutter bits, with radially-oriented sensors coupled thereto may be used.

Figure 2:
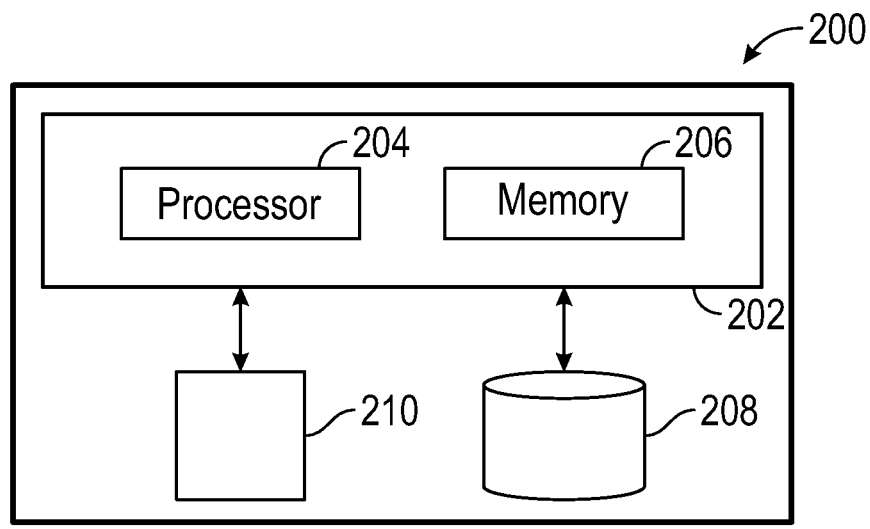
FIG. 2 illustrates a block diagram of an example computing system for use in the downhole drilling system of FIG. 1, in accordance with embodiments of the present disclosure.

FIG. 2 illustrates a block diagram of an exemplary computing system 200 for use in drilling system 100 of FIG. 1, in accordance with embodiments of the present disclosure. Computing system 200 or components thereof can be located at the surface (e.g., in control unit 110), downhole (e.g., in BHA 106 and/or in LWD/MWD apparatus 107), or some combination of both locations (e.g., certain components may be disposed at the surface while certain other components may be disposed downhole, with the surface components being communicatively coupled to the downhole components).

Computing system 200 may be configured to analyze data from radially-oriented sensors on a drill bit and visualize the data in accordance with the teachings of the present disclosure. For example, computing system 200 may be configured to generate one or more visualizations similar to those illustrated in FIGS. 4-5 and described further below. Further, computing system 200 may be used to perform the steps of the method described below with respect to FIG. 6.

In particular embodiments, computing system 200 may include data analysis module 202. Data analysis module 202 may include any suitable components. For example, in some embodiments, data analysis module 202 may include processor 204. Processor 204 may include, for example a microprocessor, microcontroller, digital signal processor (DSP), application specific integrated circuit (ASIC), or any other digital or analog circuitry configured to interpret and/or execute program instructions and/or process data. In some embodiments, processor 204 may be communicatively coupled to memory 206. Processor 204 may be configured to interpret and/or execute program instructions or other data retrieved and stored in memory 206. Program instructions or other data may constitute portions of software 208 for carrying out one or more methods described herein. Memory 206 may include any system, device, or apparatus configured to hold and/or house one or more memory modules; for example, memory 206 may include read-only memory, random access memory, solid state memory, or disk-based memory. Each memory module may include any system, device or apparatus configured to retain program instructions and/or data for a period of time (e.g., computer-readable non-transitory media). For example, instructions from software 208 may be retrieved and stored in memory 206 for execution by processor 204.

In particular embodiments, data analysis module 202 may be communicatively coupled to one or more displays 210 such that information processed by data analysis module 202 may be conveyed to operators of drilling equipment. For example, data analysis module 202 may convey data received from radially-oriented sensors coupled to drill bit 109 of FIG. 1 to display 210. As another example, data analysis module 202 may generate one or more visualizations of received data to display 210, similar to the visualizations illustrated in FIGS. 4-5.

Modifications, additions, or omissions may be made to FIG. 2 without departing from the scope of the present disclosure. For example, FIG. 2 shows a particular configuration of components of computing system 200. However, any suitable configurations of components may be used. For example, components of computing system 200 may be implemented either as physical or logical components. Furthermore, in some embodiments, functionality associated with components of computing system 200 may be implemented in special purpose circuits or components. In other embodiments, functionality associated with components of computing system 200 may be implemented in configurable general purpose circuit or components. For example, components of computing system 200 may be implemented by configured computer program instructions.

Figure 3A:
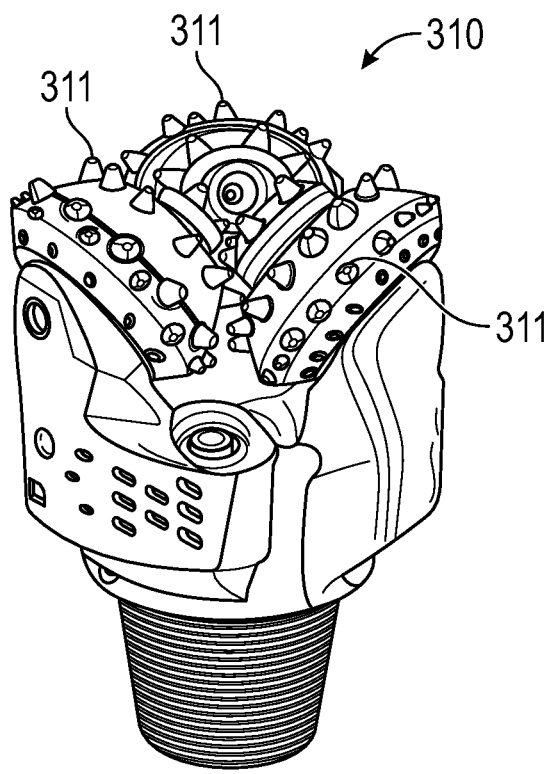
FIGS. 3A-3B illustrate example drill bit configurations with radially-oriented look-ahead formation sensors, in accordance with embodiments of the present disclosure.
Figure 3B:
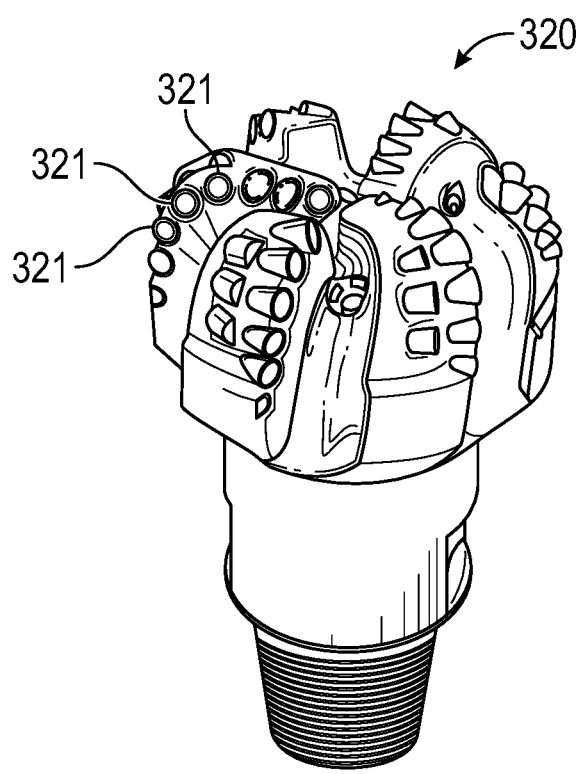

FIGS. 3A-3B illustrate example drill bit configurations with radially-oriented look-ahead formation sensors, in accordance with embodiments of the present disclosure. Specifically, FIG. 3A illustrates an example roller cone bit 310 and FIG. 3B illustrates an example fixed cutter bit 320. In particular embodiments, radially-oriented formation sensors, such as gamma ray sensors or antennas, may be located inside roller cones 311 of roller cone bit 310. In certain embodiments, the radially-oriented formation sensors may be located in cutters 321 of fixed cutter bit 320. As the radially-oriented formation sensor rotates with the drill bit, it may detect a variance in measured properties of a formation ahead of the bit. For example, gamma ray sensors may detect changes in the amount of gamma rays emitted from the formation ahead of the bit to which the sensor is coupled. Because the formation sensor is offset from the center of the drill bit (and thus the center of the borehole) it will obtain data azimuthally relative to the face of the bottom of the hole as it rotates. In particular embodiments, an orientation sensor coupled to the drill bit may detect the orientation of the formation sensor relative to a fixed point (e.g., the top side for a high side orientation sensor or magnetic north for a magnetic orientation sensor). In some embodiments, a hybrid drill bit may be employed which contains both fixed cutting structures (similar to cutters 321 of FIG. 3B) and roller cones (similar to roller cones 311 of FIG. 3A). In such embodiments, the radially-oriented formation sensors may be located in any location of the fixed cutter structures, roller cones, or any combination thereof.

As the drill bit rotates, the formation sensors may capture data associated with the formation verses the angular orientation of the formation sensor. The angular orientation of each formation sensor may be determined by an orientation sensor coupled to the drill bit that tracks the angular position of the formation sensor while the drill bit rotates. The data from the formation sensors may thus be collected using a magnitude measurement and an associated angular measurement (i.e., a polar vector). In some embodiments, bins of memory at various orientations may be used to gather data over an interval of time or depth, such as every few seconds or every few inches or feet. The memory bins may correspond to any suitable radial distance and/or angular range (with respect to the 360 degree circle) in front of the drill bit. For example, memory bins may include data collected between the range of 0-1 feet and 1-2 feet from the center of the drill bit, or may include data for every 15 degrees of the 360 degree circle around the drill bit. The bins may therefore correspond to particular angular arc spans and radial distance spans, in particular embodiments.

The use of memory bins may be particular useful in embodiments using gamma ray sensors, where gamma ray counts by the sensors may need to accumulate over the period of time or distance while drilling on bottom to ensure sufficient signals. For example, gamma ray counts may be collected and summed over particular angular ranges (e.g., 100 gamma rays counted over a first 10 degrees of drill bit rotation and 80 gamma rays counted over a second 10 degrees of drill bit rotation) and/or radial distances from the center of the drill bit (e.g., 100 gamma rays counted over a first 10 degrees of drill bit rotation, with 50 corresponding to the first radial foot from the center of the drill bit and the other 50 corresponding to the radial range of 1-2 feet from the center of the drill bit). However, binning may be performed with other types of formation sensors as well (e.g., to save memory space). For example, sensor readings may be vectors comprising a magnitude component and angular component, such as (100, 3.2°), (70, 8.1°), and (20, 15.5°). Using bins of 5 degrees (i.e., 72 total bins), each measurement would have be put into a separate bin (i.e., one bin from 1-5 degrees, one bin from 6-10 degrees, and one bin from 11-15 degrees). However, using bins of 10 degrees (i.e., 36 total bins), the first two measurements would be binned together into a bin from 1-10 degrees.

To place two or more measurements together into the same bin, any technique could be used. For example, an average of the two measurements may be used. As another example, a weighted average of the measurements may be used based on the displacement of the angular measurement from the center of the bin. The bins may be for any suitable angular range, and may depend on application or memory limitations. For example, 360 bins comprising data for one angular degree each may be used where accuracy is needed and/or memory is not limited. As another example, 20 bins comprising data for 18 angular degrees each may be used where memory is limited and/or better accuracy is not needed. Example data profiles and visualizations are described further below with respect to FIGS. 4-5.

In certain embodiments, data collected from the look-ahead formation sensors may not be collected for particular bins of the 360 degree circle. As an example, formation information may be collected at 4.5 degrees and 11.3 degrees. Using bins of 5 degrees, data may thus be collected for the bin representing 1-5 degrees and for the bin representing 11-15 degrees, but no data would be collected for the bin representing 6-10 degrees. In such situations, data for the bin representing 6-10 degrees may be interpolated based on the information associated with the adjacent bins in order to have a more accurate understanding of the formation information for the entire 360 degrees in front of the drill bit. In addition, it will be understood that interpolation techniques may be used for radial binning formats as well. For example, data may be collected for bins representing the radial distance of 0-1 feet from the center of the drill bit and from 2-3 feet from the center of the drill bit. Data for the radial bin covering the radial range of 1-2 feet from center may be interpolated using the data from the 0-1 foot range bin and the 2-3 foot range bin.

In particular embodiments, the memory bins may be unequally partitioned. For example, if there is greater interest of data around the low side of the hole, narrower bins (i.e., bins with a range covering fewer degrees) may be used in this region and larger bins may be used to record data for other regions of the sweep circle. For example, bins associated with the low side of the borehole may be bins covering a range of 5 degrees each, while bins associated with the high side of the borehole may be bins covering a range of 20 degrees each. The bins in between the low side bins and the high side bins may gradually change resolution, in some embodiments. The ranges covered by the memory bin may be dynamically adjusted using pre-programmed instructions based on feedback from various sensors that sense formation or borehole properties to permit higher resolution of areas of more importance. For example, if a high gradient in the sensed formation data is detected in a particular area in front of the drill bit, the angular range covered by the bins in that area may be decreased (i.e., the resolution of data in that area may be increased). Such adjustments may be made from the surface of the wellbore by a control unit (e.g., control unit 110) automatically or by an operator of the drilling system who may downlink commands to a downhole binning controller.

Although illustrated in FIGS. 3A-3B as radially-oriented formation sensors coupled to drill bits, it will be understood by those of ordinary skill in the art that sensors in accordance with the present disclosure may be located at any suitable location of the downhole drilling system for sensing formation information at a depth in front of the drill bit of the drilling system, such as immediately in front of the drill bit. For example, formation sensors may be located in the center of the drill bit and configured to sense radially in front of the drill bit to compile information into radial memory bins. As another example, formation sensors may be located further up the BHA from the drill bit, while being operable to sense formation information ahead of the drill bit. Formation sensors according to the present disclosure may also be configured to sense data from a number of depths ahead of, behind, or beside the drill bit. In such embodiments, mathematical algorithms may be configured to determine which portion of the sensed formation information is from in front of the drill bit versus behind the drill bit. This may also allow an operator to select different depths ahead of the drill bit at which to display formation information.

Modifications, additions, or omissions may be made to FIG. 2 without departing from the scope of the present disclosure. For example, although FIG. 3A illustrates formation sensors as being located inside roller cones 311, it will be understood that the sensors may be located in the body or shank of bit 310, or in the journal arm that supports the roller cone 311. As another example, although FIG. 3B illustrates formation sensors as being located inside cutters 321 of bit 320, it will be understood that the sensors may be located in the body of bit 320 or in the blades of bit 320.

Figure 4A:
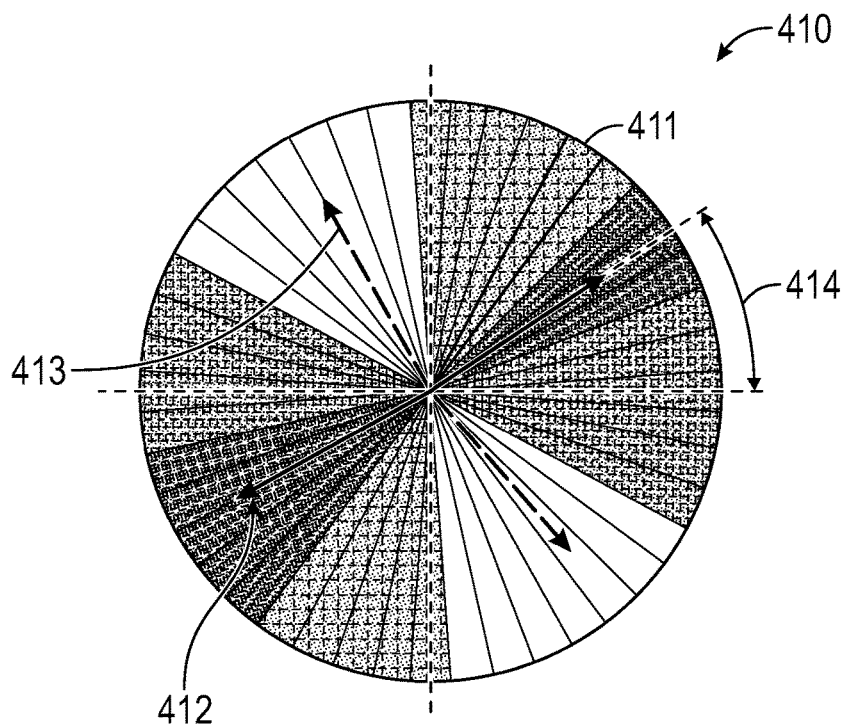
FIGS. 4A-4C illustrate example visualizations of data received from look-ahead formation sensors coupled to a downhole drilling system, in accordance with embodiments of the present disclosure.
Figure 4B:
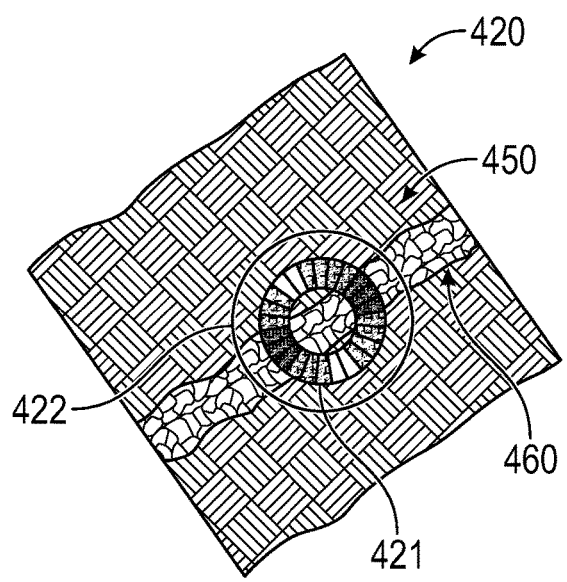
Figure 4C:
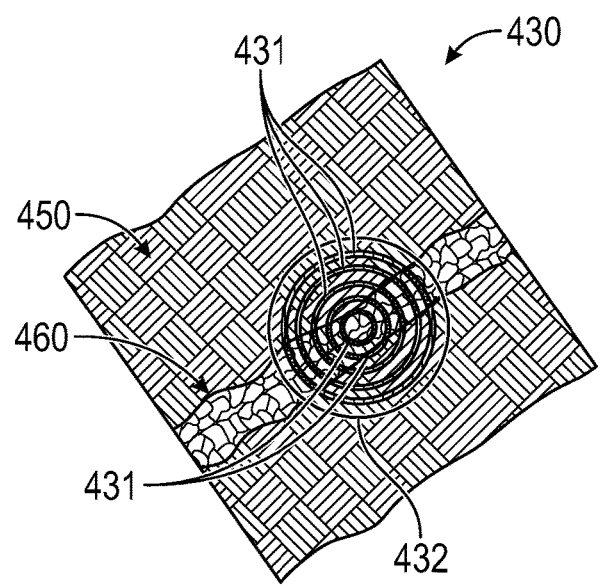

FIGS. 4A-4C illustrate example visualizations of data received from look-ahead formation sensors of a downhole drilling system, in accordance with embodiments of the present disclosure. The data may be received from radially-oriented formation sensors coupled to a drill bit (e.g., sensors in roller cones 311 of bit 310 of FIG. 3A, or sensors in cutters 321 of bit 320 of FIG. 3B) in some embodiments. In other embodiments, the data may be received from formation sensors coupled to a portion of the drilling system further uphole, such as sensors coupled to the drill string of the drilling system. The formation sensors may be configured to sense formation information, such as gamma ray radiation or formation resistivity, at a depth in front of the drill bit. In particular embodiments, the formation information collected by the look-ahead sensors may be information associated with the formation immediately in front of the drill bit.

FIG. 4A illustrates an example visualization 410 of formation sensor data collected into bins as described above with respect to FIGS. 3A-3B. Contrasting shading or coloring may be used as shown in FIG. 4A to indicate certain information contained within the data received from the formation sensors coupled to the drill bit. The shading may indicate, for example, where the "hottest" and "coldest" parts of the borehole (e.g., where the highest and lowest gamma ray levels are detected for gamma ray sensors) are relative to a fixed reference, such as gravity highside (i.e., the top of FIG. 4A is the high side of the borehole relative to some fixed reference of the earth such as the gravity vector, magnetic vector or earth spin vector that may be resolved to a North reference point, and the bottom of FIG. 4A is the low side of the hole). The visualization 410 may be divided into sections 411 in some embodiments, with sections 411 corresponding with one or more memory bins. In particular embodiments, the sections 411 may further comprise radial subsections, such as where memory bins correspond to both angular and radial ranges. The memory bins may be a compilation of data from the formation sensors associated with a certain range of angles or radial distances. The range of angles for the memory bins may come from an equal division of the available 360 degrees, and the radial range of distances for memory bins may be any suitable distance and may be determined based upon the formation sensors used (e.g., the radial range of the sensors). For example, there may be 36 total memory bins wherein data from formation sensors associated with any degree between 1 and 10 may be associated with a first memory bin, data from formation sensors associated with any degree between 11 and 20 may be associated with a second memory bin, and so forth. Those bins may be further divided into any number of radial subsections, such as into two or three radial subsections, for further resolution of the formation information received from the formation sensors.

In some embodiments, an offset to the bins may be applied in order to have the center of certain bins align with the 0, 90, 180, and 270 degree axes. As an example, an embodiment with 20 memory bins comprising data for 18 degrees each, an offset of 9 degrees may be applied so that the center of the top bin lines up with the upper axis. In some embodiments, the data from the memory bins may be displayed with smooth transitions instead of with step-wise transitions between the bins. For example, a smooth gradient of contrast may be displayed by determining a value for each pixel around the ring of data by interpolating between adjacent measurement points in the data. Similarly, where radial bins are used (such as in the data for visualization 430 of FIG. 4C), interpolation techniques may also be used to determine and display data for areas between the radial bins (e.g., between rings 431 of FIG. 4C). In some embodiments, additional bins (beyond those in memory) may be determined and displayed using interpolation between memory bins. The gradient transitions between bins may be radial and/or angular in nature, and may use the center angle or center point of the bins to initiate the interpolation between defined bin center points.

In certain embodiments, the visualization 410 may include indications of maxima 412 and/or minima 413 in the data from the formation sensors. There may be a plurality of maximas 412 or minimas 413, wherein some have indicators in visualization 410 and others do not have such indicators. The maxima 412 and minima 413 may be determined using any suitable method. For example, a gradient of the magnitude versus the angular position may be calculated, with the maxima and minima positions being determined based on variance thresholds. In some embodiments, the visualization 410 may include an indication of the actual or apparent formation dip angle 414 and/or dip direction, which may be determined based on a highside reference point, the determined maxima and/or minima, and/or borehole survey data such as inclination and azimuth information.

In particular embodiments, the visualization of the data received from the formation sensors (e.g., visualization 410) may be superimposed over a visualization of the formation composition. The visualization of the formation composition may be based on any suitable data (e.g., survey data), and may be based at least in part on the data received from the formation sensors on the drill bit in certain embodiments. In certain embodiments, the formation composition may be based in part by survey measurements taken prior to drilling and in part by measurements from formation sensors on the drill bit. As such, the formation composition displayed in the visualization may be updated periodically to reflect new information gathered by the formation sensors.

FIG. 4B illustrates an example visualization 420 of data received from formation sensors coupled to a roller cone bit, such as drill bit 310 of FIG. 3A, superimposed onto a display of the estimated formation composition. Visualization 420 includes an illustration 421 of the sweep diameter in the borehole (i.e., the radial distance at which the sensors rotate within the borehole) along with an indication of the outer borehole diameter 422. In certain embodiments, the data from formation sensors on the roller cones may be superimposed upon the sweep diameter illustration 421 as shown in FIG. 4B. The illustration of the formation in visualization 420 further includes an indication of a layer of sand 450 and a layer of shale 460. FIG. 4C illustrates an example visualization of data received from formation sensors coupled to a fixed cutter bit, such as drill bit 320 of FIG. 3B, superimposed onto a display of the estimated formation composition. As in FIG. 4B, the illustration of the formation in visualization 430 includes an indication of sand 450 and a layer of shale 460. Visualization 430 may also include rings 431 indicating the sweep diameters of the cutters of the fixed cutter bit, along with an indication 432 of the outer borehole diameter. In certain embodiments, the data from formation sensors on the cutters may be superimposed upon the sweep diameter illustration 431 as shown in FIG. 4C. In embodiments where only low speed telemetry is available, the profile displayed in the visualization may include only the determined maxima and/or the minima (e.g., by polar vectors) rather than the entire set of data from the formation sensors.

Using the data from the formation sensors, a drilling operator may be able to estimate formation properties in front of or near the face of the drill bit. In addition, the properties from the formation sensors may indicate that the drill bit is at or near a formation boundary, such as the boundary between sand and shale. These may aid an operator in steering decisions. The boundary determinations may be determined based on threshold responses from the formation sensors, in some embodiments. The formation composition and boundary changes may be determined from the formation sensor measurements and may be displayed in the visualization alongside the data from the formation sensors. For example, as shown in visualization 410, the sensor measurements contain maxima 412 at formation dip angle 414 and minima 413 at 90 degrees from the maxima. Accordingly, it may be estimated that a formation boundary occurs where maxima 412 occur, and visualizations 420 and 430 of FIGS. 4B and 4C, respectively may display shale layer 460 where the higher measurements appear and sand layers 450 where the lower measurements appear. As drilling continues over time, the measurements from the formation sensors may be used to determine the formation along the wellbore, and may be displayed to an operator in two or three dimensions as discussed further below with respect to FIGS. 5A-5C.

It will be understood by those of ordinary skill in the art that aspects of visualizations 410, 420, and 430 may be modified as required by an operator of the drilling system. For example, the transparency of the sensor data superimposed upon the formation composition may be modified. As another example, the operator may be able to select between simple sensor sweep views with and without the sensor data included therein.

Modifications, additions, or omissions may be made to FIGS. 4A-4C without departing from the scope of the present disclosure. For example, borehole diameter indicators 422 and 432 may be excluded from visualizations 420 and 430, respectively. As another example, a polar plot of the formation sensor measurements may be displayed instead of the contrasted bins, or may be overlaid on the contrasted bin data.

Figure 5A:
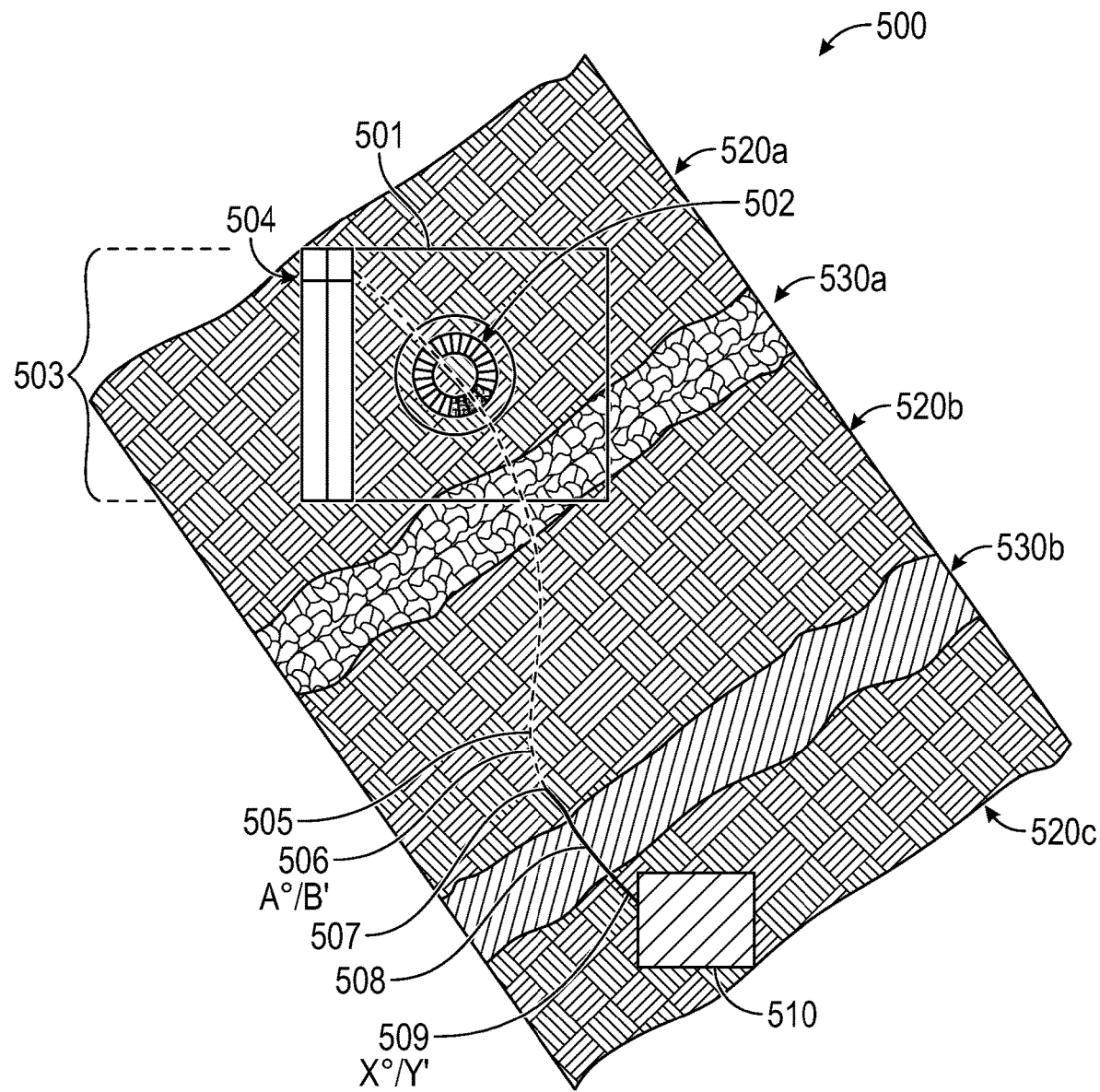
FIGS. 5A-5C illustrate example visualizations of data from look-ahead formation sensors coupled to a downhole drilling system over time, in accordance with embodiments of the present disclosure.
Figure 5B:
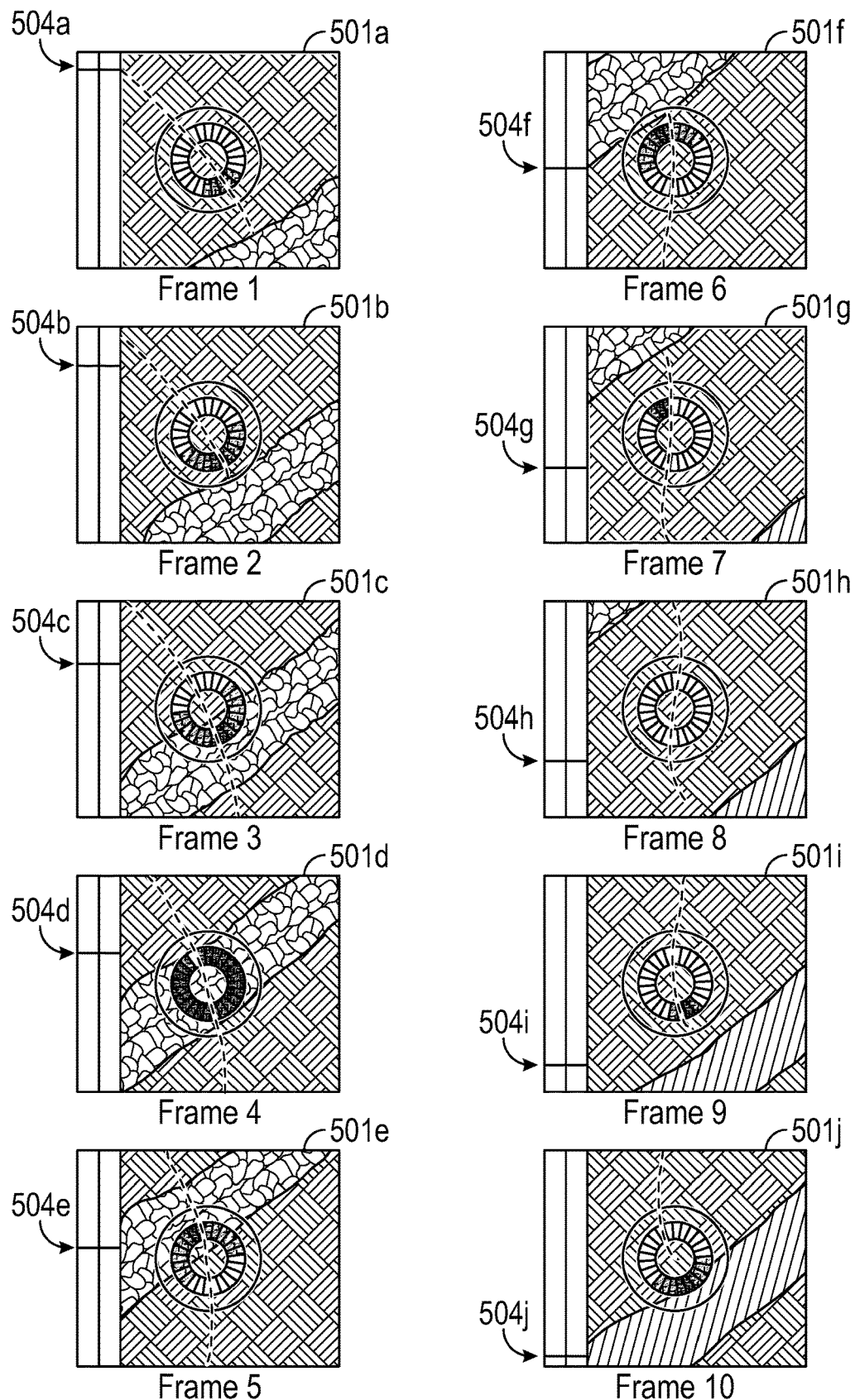
Figure 5C:
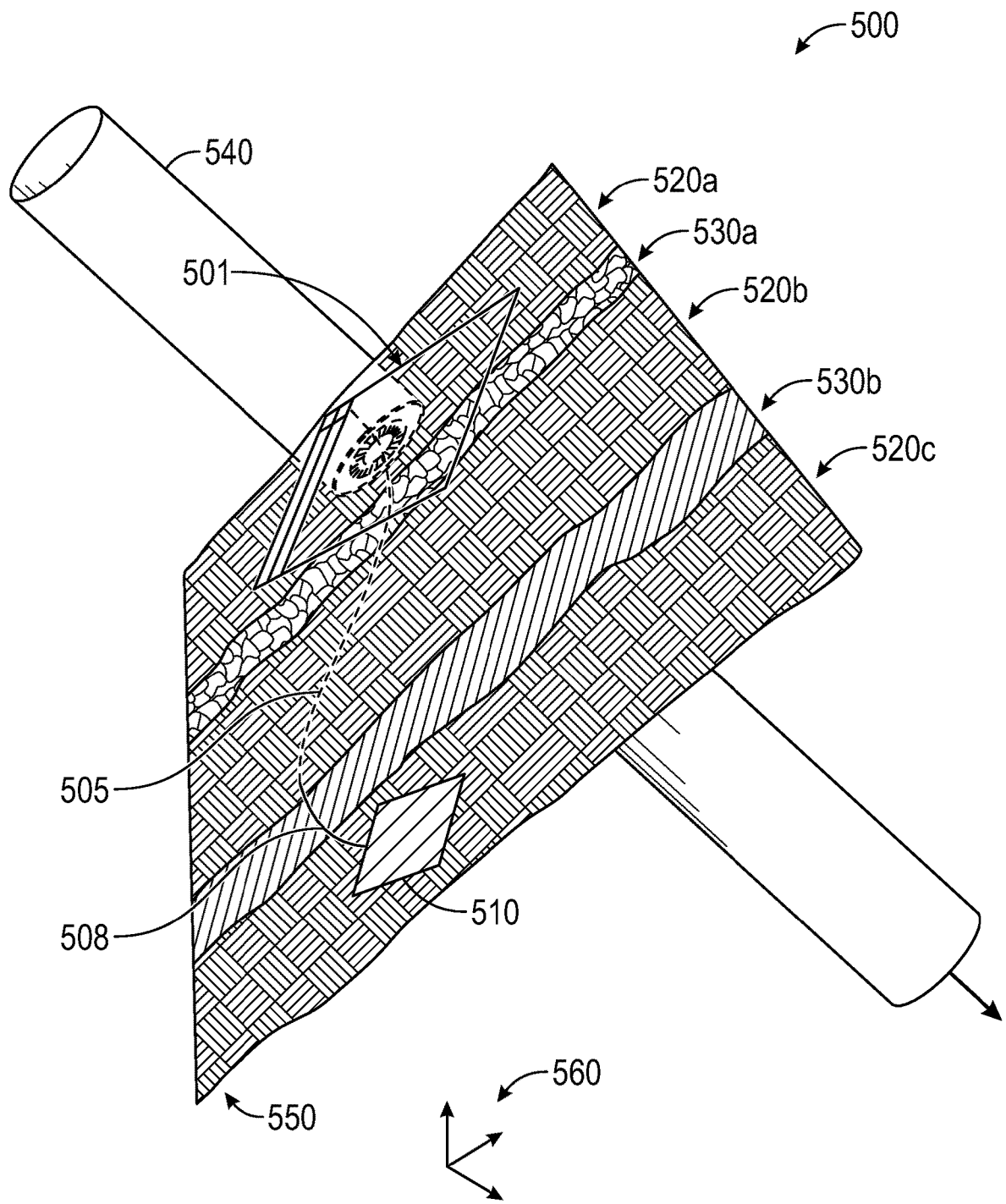

FIGS. 5A-5C illustrate an example visualization 500 of data from radially-oriented sensors coupled to a drill bit of a downhole drilling system over time, in accordance with embodiments of the present disclosure. FIG. 5A may be an animation showing the formation sensor data over a particular depth range, which may be useful to show different formation changes over the specified depth range. In addition, the animation may show how the borehole path moves with respect to a certain plane within the formation. The animation may include a window 501 that displays the formation sensor information 502 along with a drilling depth indicator 503 showing the current depth 504. As the animation progresses (as shown in FIG. 5B), the position of window 501 will progress along actual trajectory 505 (i.e., what has actually been drilled). The animation may include an indication of the actual trajectory 505 (before and/or after the location of window 501) of the drilling in the formation along with an indication of the current steering angle 506 (measured in degrees per foot) at a particular depth up to current drilling depth 507. FIG. 5B illustrates frames of window 501 over time as the animation of formation sensor data progresses. As the animation progresses, the current drilling depth indicator 503 may change to indicate the drilling depth associated with the information being displayed in window 501.

In particular embodiments, window 501 may be superimposed over an estimated formation composition as shown in FIG. 5A. Formation composition may be determined based on one or more measurements (e.g., survey measurements), and may be displayed along with the formation sensor data as shown in FIG. 5A. In some embodiments, the formation composition may determined based at least in part on the information received from the formation sensors coupled to the drill bit. In certain embodiments, the formation composition may be based in part by survey measurements taken prior to drilling and in part by measurements from formation sensors on the drill bit. As such, the formation composition displayed in visualization 500 may be updated periodically to reflect new information gathered by the formation sensors.

A future trajectory 508 of the drilling in the formation (i.e., not yet drilled) may also be indicated along with a future steering angle 509 in visualization 500. In certain embodiments, the future trajectory 508 and future steering angle 509 may be determined using the location of a particular target 510 within the formation. The future steering angle 509 may be provided to an automatic steering system or to an operator of the drilling system for use in steering the wellbore toward the target 510. As drilling progresses, the determined future trajectory 508 and future steering angle 509 may be updated and displayed accordingly. In certain embodiments, the future trajectory may be limited by particular constraints, such as the physical limits of the steering angle for the drilling system (e.g., the maximum dogleg allowed for the drilling system).

In certain embodiments, the positions of the boundary layers in the formation may be modified to adjust the thickness and/or starting points of the layers as it becomes evident by the changing sensor response. For example, referring to Frame 1 of FIG. 5B, it might be evident that the sand layer is not as dirty with shale as originally determined (such as through survey measurements) at an expected depth based on formation information from previous well bores in the area, so the boundary layer of the shale could be adjusted to move closer to the sensor based on the response from the formation sensors, thus adjusting the location of formation boundaries based on depth for the current well bore being drilled. This may be done by offsetting the formation location relative to the borehole, formation layer thickness, surface location, or dip angle, or any combination thereof. In certain embodiments, additional sensors (e.g. resistivity or acoustic sensors) coupled to the drilling system or drill bit may be used to detect bed boundary distances to aid in determining a distance to a formation boundary change. Settings in software may be adjusted to include thresholds for delineating where a detected formation boundary occurs. For example, in embodiments using gamma ray sensors, gamma ray counts above 100 may indicate the start or end of a shale boundary depending on calibration of the sensors. Furthermore, in some embodiments, gradients of the measured values from the formation sensors may be used to determine a distance to the formation boundary. By measuring the rate of change of the sensor value, the distance to the formation boundary may be extrapolated if the gradient of the formation region is understood, such as from previous offset well log data.

In some embodiments, visualization 500 may be a three dimensional visualization. FIG. 5C illustrates an example three dimensional display of visualization 500 wherein the borehole is superimposed on a three dimensional drilling path 540 while a layer of rock face shows the path over the selected depth interval that the borehole follows relative to the rock face plane 550. As the visualization progresses, the composition of the rock face plane 550 may change as the formation changes with depth. The rock face plane 550 may stay fixed to the cross axis of plane of the borehole or may be fixed cross axis to a particular direction. In particular embodiments, the visualization may be manipulated around different axes to view it from various perspectives. Accordingly, an axis indicator 560 may be displayed in the three dimensional visualization to aid in understanding the particular perspective view being displayed. In addition, the thickness of the rock face plan 550 may be modified. For example, the relatively thin perspective shown in FIG. 5C may be thickened such that the rock becomes more like a volume of rock with the various layers 520 and 530 being displayed in three dimensions. The volume may be of variable translucence to allow an operator to view the inner portions of the volume better.

In certain embodiments, the depths of view ahead of the bit (a measurement depth of the formation sensors ahead of the drill bit or the visualization of such data) may be adjustable by an operator of the drilling system. The depth of view may be selected from various depths of investigation of the formation sensors. The depths of investigation may be selected to be a distance to a detected or anticipated formation bed boundary, in some embodiments.

It will be understood by those of ordinary skill in the art that aspects of visualization 500 may be modified as required by an operator of the drilling system. For example, the transparency of the sensor data superimposed upon the formation composition may be modified. As another example, the operator may be able to select between simple sensor sweep views with and without the sensor data included therein. As yet another example, the operator may be able to pause, rewind, fast forward, or otherwise manipulate the animation as desired. As yet another example, the operator may be able to zoom in or out of the animation.

Modifications, additions, or omissions may be made to FIGS. 5A-5C without departing from the scope of the present disclosure. For example, the formation composition displayed in visualization 500 may change periodically based on readings from sensors coupled to the drilling system. As another example, although illustrated in visualization 500 using discrete bins, the formation sensor data may be illustrated using a smooth gradient (e.g., from interpolation), using a polar plot of the formation sensor data, or using maxima and/or minima vectors only.

Figure 6:
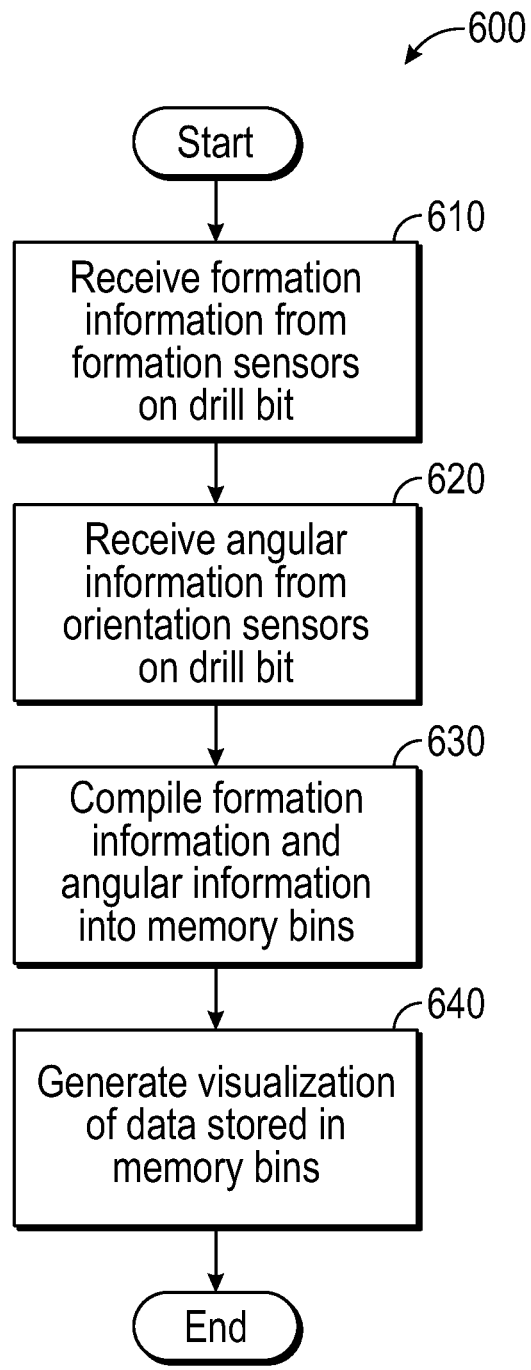
FIG. 6 illustrates an example method for collecting and visualizing data from look-ahead formation sensors coupled to a downhole drilling system, in accordance with embodiments of the present disclosure While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

FIG. 6 illustrates an example method 600 for collecting and visualizing data from radially-oriented formation sensors coupled to a drill bit of a downhole drilling system, in accordance with embodiments of the present disclosure. The method begins at step 610, where formation information is received from radially-oriented formation sensors on a drill bit. The radially-oriented formation sensors may be any suitable type of sensor, such as gamma ray sensors or antennas. The formation sensors may be coupled to roller cones of a roller cone drill bit or to cutters of a fixed cutter drill bit, or may be further up in the drill string. The formation information may include any suitable information about the formation, such as gamma ray radiation, resistivity, acoustic noise (such as stress wave velocity in the formation), magnetic resonance imaging, density, porosity, mechanical properties of the rock, such as compressive strength or Young's modulus, rock stress direction, magnetic or electric fields from nearby man-made structures (such as is used in well bore ranging to detect a lost drill string), or a target well bore. The formation information may be associated with any depth in front of the drill bit, such as immediately in front of the drill bit or 5 meters in front of the drill bit. At step 620, angular information is received from orientation sensors on the drill bit. The angular information received may include angular information for each of the formation sensors on the drill bit, and may be specifically associated with a particular formation sensor.

At step 630, the formation information and angular information is compiled into memory bins. This may be done through any suitable means, and may depend on the type of formation sensor used. For example, gamma ray counts may be collected and summed over particular angular ranges (e.g., 100 gamma rays counted over a first 10 degrees of drill bit rotation and 80 gamma rays counted over a second 10 degrees of drill bit rotation). However, binning may be performed with other types of formation sensors as well (e.g., to save memory space). For example, sensor readings may be vectors comprising a magnitude component and angular component, such as (100, 3.2°), (70, 8.1°), and (20, 15.5°). Using bins of 5 degrees (i.e., 72 total bins), each measurement would have be put into a separate bin (i.e., one bin from 1-5 degrees, one bin from 6-10 degrees, and one bin from 11-15 degrees). However, using bins of 10 degrees (i.e., 36 total bins), the first two measurements would be binned together into a bin from 1-10 degrees. To place two or more measurements together into the same bin, any technique could be used. For example, an average of the two measurements may be used. As another example, a weighted average of the measurements may be used based on the displacement of the angular measurement from the center of the bin. The bins may be for any suitable angular range, and may depend on application or memory limitations. For example, 360 bins comprising data for one angular degree each may be used where accuracy is needed and/or memory is not limited. As another example, 20 bins comprising data for 18 angular degrees each may be used where memory is limited and/or better accuracy is not needed.

At step 640, a visualization of the data stored in the memory bins is generated. The visualization may be any suitable visualization for conveying the data in the memory bins. The visualization may include, for example, data showing the formation sensor measurements in relation to their associated angular information. This may be conveyed through the use of contrasting bins in a circular display, polar plots, and/or vectors indicating maxima and/or minima of the measurements. The visualization may be in two or three dimensions, and may look like any of the visualizations illustrated in FIGS. 4-5. For instance, the visualization may include indications of drilling depths, wellbore trajectories, and/or steering angles. The visualization may be able to be manipulated by an operator viewing or otherwise interacting with the visualization. The visualization may be updated periodically based on newly received information, such as new formation information and angular information from the formation sensors and orientation sensors, respectively.

Modifications, additions, or omissions may be made to method 700 without departing from the scope of the present disclosure. For example, the order of the steps may be performed in a different manner than that described and some steps may be performed at the same time. Additionally, each individual step may include additional steps without departing from the scope of the present disclosure.

To provide illustrations of one or more embodiments of the present disclosure, the following examples are provided. In one embodiment, a system comprises a processor, a memory, and a data analysis module. The data analysis module is operable to receive formation information from each of a plurality of formation sensors coupled to a downhole drilling system, the formation information being associated with one or more properties of a formation at a depth in front of the downhole drilling system, receive angular information from one or more orientation sensors coupled to the downhole drilling system, the angular information being associated with the formation information, compile sensor data based on the formation information and the angular information, and generate a visualization based on the sensor data.

In one or more aspects of the disclosed system, compiling the sensor data comprises storing the sensor data into memory bins based on the angular information.

In one or more aspects of the disclosed system, the data analysis module is further operable to receive radial information from the one or more orientation sensors, the radial information being associated with the formation information. In one or more aspects of the disclosed system, compiling the sensor data is further based on the radial information. In one or more aspects of the disclosed system, compiling the sensor data comprises storing the sensor data into memory bins based on the radial information and the angular information.

In one or more aspects of the disclosed system, the data analysis module is further operable to determine formation composition information based on the sensor data. In one or more aspects of the disclosed system, the formation composition information is further based on survey measurement data. In one or more aspects of the disclosed system, the visualization comprises an indication of the formation composition information.

In one or more aspects of the disclosed system, compiling the formation information comprises interpolating sensor data.

In one or more aspects of the disclosed system, generating the visualization based on the sensor data comprises generating a smooth gradient by interpolating the sensor data.

In one or more aspects of the disclosed system, the formation sensors are gamma ray sensors, and compiling the sensor data comprises counting gamma rays detected by the gamma ray sensors over an angular range.

In one or more aspects of the disclosed system, the formation sensors are antennas, and compiling the sensor data comprises averaging the magnitudes of formation information received over an angular range.

In one or more aspects of the disclosed system, the formation sensors are radially-oriented on a drill bit of the downhole drilling system.

In one or more aspects of the disclosed system, the drill bit is a roller cone bit and the formation sensors are disposed within roller cones of the roller cone bit.

In one or more aspects of the disclosed system, the drill bit is a fixed cutter bit and the formation sensors are disposed within cutters of the fixed cutter bit.

In one or more aspects of the disclosed system, the drill bit is a hybrid bit comprising fixed cutters and roller cone structures, and the formation sensors are disposed within at least one of the fixed cutters, a body of the drill bit, an arm of the roller cone structures, or the roller cone structures.

In one or more aspects of the disclosed system, the formation sensors are centrally located on a drill bit of the downhole drilling system and operable to radially sense the formation information.

In one or more aspects of the disclosed system, the data analysis module is operable to select the depth in front of the downhole drilling system.

In one or more aspects of the disclosed system, the formation information includes information associated with one or more properties of the formation immediately in front of the drill bit.

In one or more aspects of the disclosed system, the visualization includes an indication of a past trajectory of the wellbore. In one or more aspects of the disclosed system, the past trajectory includes a past steering angle.

In one or more aspects of the disclosed system, the data analysis module is operable to determine a future trajectory of the wellbore using a target location in the formation, and the visualization includes an indication of the future trajectory of the wellbore. In one or more aspects of the disclosed system, the future trajectory includes a future steering angle.

In one or more aspects of the disclosed system, the visualization includes an indication of a depth associated with the sensor data being visualized.

In one or more aspects of the disclosed system, the visualization includes a borehole diameter and a sensor sweep diameter.

In one or more aspects of the disclosed system, the visualization includes an animation of the sensor data over time.

In one or more aspects of the disclosed system, the data analysis module is operable to modify one or more aspects of the visualization based on input from an operator of the drilling system.

In one or more aspects of the disclosed system, the visualization is two dimensional.

In one or more aspects of the disclosed system, the visualization is three dimensional.

In one or more aspects of the disclosed system, the data analysis module is further operable to update the visualization periodically.

In another embodiment, a method comprises receiving formation information from each of a plurality of formation sensors coupled to a downhole drilling system, the formation information being associated with one or more properties of a formation at a depth in front of the downhole drilling system, receiving angular information from one or more orientation sensors coupled to the downhole drilling system, the angular information being associated with the formation information, compiling sensor data based on the formation information and the angular information, and generating a visualization based on the sensor data.

In one or more aspects of the disclosed method, compiling the sensor data comprises storing the sensor data into memory bins based on the angular information.

In one or more aspects of the disclosed method, the method further comprises receiving radial information from the one or more orientation sensors, the radial information being associated with the formation information. In one or more aspects of the disclosed method, compiling the sensor data is further based on the radial information. In one or more aspects of the disclosed method, compiling the sensor data comprises storing the sensor data into memory bins based on the radial information and the angular information.

In one or more aspects of the disclosed method, the method further comprises determining formation composition information based on the sensor data. In one or more aspects of the disclosed method, the formation composition information is further based on survey measurement data. In one or more aspects of the disclosed method, the visualization comprises an indication of the formation composition information.

In one or more aspects of the disclosed method, compiling the formation information comprises interpolating sensor data.

In one or more aspects of the disclosed method, generating the visualization based on the sensor data comprises generating a smooth gradient by interpolating the sensor data.

In one or more aspects of the disclosed method, the formation sensors are gamma ray sensors, and compiling the sensor data comprises counting gamma rays detected by the gamma ray sensors over an angular range.

In one or more aspects of the disclosed method, the formation sensors are antennas, and compiling the sensor data comprises averaging the magnitudes of formation information received over an angular range.

In one or more aspects of the disclosed method, the formation sensors are radially-oriented on a drill bit of the downhole drilling system.

In one or more aspects of the disclosed method, the drill bit is a roller cone bit and the formation sensors are disposed within roller cones of the roller cone bit.

In one or more aspects of the disclosed method, the drill bit is a fixed cutter bit and the formation sensors are disposed within cutters of the fixed cutter bit.

In one or more aspects of the disclosed method, the drill bit is a hybrid bit comprising fixed cutters and roller cone structures, and the formation sensors are disposed within at least one of the fixed cutters, a body of the drill bit, an arm of the roller cone structures, or the roller cone structures.

In one or more aspects of the disclosed method, the formation sensors are centrally located on a drill bit of the downhole drilling system and operable to radially sense the formation information.

In one or more aspects of the disclosed method, the method further comprises selecting the depth in front of the downhole drilling system.

In one or more aspects of the disclosed method, the formation information includes information associated with one or more properties of the formation immediately in front of the drill bit.

In one or more aspects of the disclosed method, the visualization includes an indication of a past trajectory of the wellbore. In one or more aspects of the disclosed method, the past trajectory includes a past steering angle.

In one or more aspects of the disclosed method, the method further comprises determining a future trajectory of the wellbore using a target location in the formation, and the visualization includes an indication of the future trajectory of the wellbore. In one or more aspects of the disclosed method, the future trajectory includes a future steering angle.

In one or more aspects of the disclosed method, the visualization includes an indication of a depth associated with the sensor data being visualized.

In one or more aspects of the disclosed method, the visualization includes a borehole diameter and a sensor sweep diameter.

In one or more aspects of the disclosed method, the visualization includes an animation of the sensor data over time.

In one or more aspects of the disclosed method, the method further comprises modifying one or more aspects of the visualization based on input from an operator of the drilling system.

In one or more aspects of the disclosed method, the visualization is two dimensional.

In one or more aspects of the disclosed method, the visualization is three dimensional.

In one or more aspects of the disclosed method, the method further comprises updating the visualization periodically.

In another embodiment, a computer-readable medium comprises instructions that, when executed by a processor, cause the processor to receive formation information from each of a plurality of formation sensors coupled to a downhole drilling system, the formation information being associated with one or more properties of a formation at a depth in front of the downhole drilling system, receive angular information from one or more orientation sensors coupled to the downhole drilling system, the angular information being associated with the formation information, compile sensor data based on the formation information and the angular information, and generate a visualization based on the sensor data.

In one or more aspects of the disclosed computer-readable medium, compiling the sensor data comprises storing the sensor data into memory bins based on the angular information.

In one or more aspects of the disclosed computer-readable medium, the medium further comprises instructions that, when executed, cause the processor to receive radial information from the one or more orientation sensors, the radial information being associated with the formation information. In one or more aspects of the disclosed computer-readable medium, compiling the sensor data is further based on the radial information. In one or more aspects of the disclosed computer-readable medium, compiling the sensor data comprises storing the sensor data into memory bins based on the radial information and the angular information.

In one or more aspects of the disclosed computer-readable medium, the medium further comprises instructions that, when executed, cause the processor to determine formation composition information based on the sensor data. In one or more aspects of the disclosed computer-readable medium, the formation composition information is further based on survey measurement data. In one or more aspects of the disclosed computer-readable medium, the visualization comprises an indication of the formation composition information.

In one or more aspects of the disclosed computer-readable medium, compiling the formation information comprises interpolating sensor data.

In one or more aspects of the disclosed computer-readable medium, generating the visualization based on the sensor data comprises generating a smooth gradient by interpolating the sensor data.

In one or more aspects of the disclosed computer-readable medium, the formation sensors are gamma ray sensors, and compiling the sensor data comprises counting gamma rays detected by the gamma ray sensors over an angular range.

In one or more aspects of the disclosed computer-readable medium, the formation sensors are antennas, and compiling the sensor data comprises averaging the magnitudes of formation information received over an angular range.

In one or more aspects of the disclosed computer-readable medium, the formation sensors are radially-oriented on a drill bit of the downhole drilling system.

In one or more aspects of the disclosed computer-readable medium, the drill bit is a roller cone bit and the formation sensors are disposed within roller cones of the roller cone bit.

In one or more aspects of the disclosed computer-readable medium, the drill bit is a fixed cutter bit and the formation sensors are disposed within cutters of the fixed cutter bit.

In one or more aspects of the disclosed computer-readable medium, the drill bit is a hybrid bit comprising fixed cutters and roller cone structures, and the formation sensors are disposed within at least one of the fixed cutters, a body of the drill bit, an arm of the roller cone structures, or the roller cone structures.

In one or more aspects of the disclosed computer-readable medium, the formation sensors are centrally located on a drill bit of the downhole drilling system and operable to radially sense the formation information.

In one or more aspects of the disclosed computer-readable medium, the medium further comprises instructions that, when executed, cause the processor to select the depth in front of the downhole drilling system.

In one or more aspects of the disclosed computer-readable medium, the formation information includes information associated with one or more properties of the formation immediately in front of the drill bit.

In one or more aspects of the disclosed computer-readable medium, the visualization includes an indication of a past trajectory of the wellbore. In one or more aspects of the disclosed computer-readable medium, the past trajectory includes a past steering angle.

In one or more aspects of the disclosed computer-readable medium, the medium further comprises instructions that, when executed, cause the processor to determine a future trajectory of the wellbore using a target location in the formation, and the visualization includes an indication of the future trajectory of the wellbore. In one or more aspects of the disclosed computer-readable medium, the future trajectory includes a future steering angle.

In one or more aspects of the disclosed computer-readable medium, the visualization includes an indication of a depth associated with the sensor data being visualized.

In one or more aspects of the disclosed computer-readable medium, the visualization includes a borehole diameter and a sensor sweep diameter.

In one or more aspects of the disclosed computer-readable medium, the visualization includes an animation of the sensor data over time.

In one or more aspects of the disclosed computer-readable medium, the medium further comprises instructions that, when executed, cause the processor to modify one or more aspects of the visualization based on input from an operator of the drilling system.

In one or more aspects of the disclosed computer-readable medium, wherein the visualization is two dimensional.

In one or more aspects of the disclosed computer-readable medium, wherein the visualization is three dimensional.

In one or more aspects of the disclosed computer-readable medium, the medium further comprises instructions that, when executed, cause the processor to update the visualization periodically.

Illustrative embodiments of the present disclosure have been described herein. In the interest of clarity, not all features of an actual implementation may have been described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

It will be understood that the terms "couple" or "couples" as used herein are intended to mean either an indirect or a direct connection. Thus, if a first device couples to a second device, that connection may be through a direct connection, or through an indirect electrical or mechanical connection via other devices and connections. It will also be understood that the terms "drilling equipment" and "drilling system" are not intended to limit the use of the equipment and processes described with those terms to drilling an oil well. The terms will also be understood to encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

To facilitate a better understanding of the present disclosure, examples of certain embodiments have been given. In no way should the examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described above with respect to one implementation are not intended to be limiting.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A system for visualizing data from look-ahead sensors, comprising:
   a processor;
   a memory; and
   one or more instructions stored in the memory, wherein the one or more instructions that, when executed by the processor, cause the processor to:
   receive formation information from each of a plurality of formation sensors coupled to a drill bit of a downhole drilling system, the formation information being associated with a variance of one or more measured properties of a formation azimuthally relative to a face of the drill bit at a depth ahead of the drill bit;
   receive angular information from one or more orientation sensors coupled to the downhole drilling system, the angular information being associated with the formation information, wherein the angular information tracks an angular position of each of the plurality of formation sensors while the drill bit rotates;
   compile sensor data based on the formation information and the angular information; and
   generate a visualization based on the sensor data that comprises azimuth information, wherein the visualization includes an indication of at least one of actual formation dip angle, apparent formation dip angle and dip direction.

2. The system of claim 1, wherein compiling the sensor data comprises storing the sensor data into memory bins based on the angular information.

3. The system of claim 1, wherein the one or more instructions that, when executed by the processor, further cause the processor to receive radial information from the one or more orientation sensors, the radial information being associated with the formation information.

4. The system of claim 3, wherein compiling the sensor data is further based on the radial information.

5. The system of claim 4, wherein compiling the sensor data comprises storing the sensor data into memory bins based on the radial information and the angular information.

6. The system of claim 1, wherein the one or more instructions that, when executed by the processor, further cause the processor to determine formation composition information based on the sensor data.

7. The system of claim 6, wherein the formation composition information is further based on survey measurement data.

8. The system of claim 6, wherein the visualization comprises an indication of the formation composition information.

9. The system of claim 1, wherein compiling the sensor data based on the formation information comprises interpolating sensor data.

10. The system of claim 1, wherein generating the visualization based on the sensor data comprises generating a smooth gradient by interpolating the sensor data.

11. The system of claim 1, wherein the formation sensors are gamma ray sensors, and compiling the sensor data comprises counting gamma rays detected by the gamma ray sensors over an angular range.

12. The system of claim 1, wherein the formation sensors are antennas, and compiling the sensor data comprises averaging the magnitudes of formation information received over an angular range.

13. The system of claim 1, wherein the formation sensors are radially-oriented on a drill bit of the downhole drilling system.

14. The system of claim 13, wherein the drill bit is a roller cone bit and the formation sensors are disposed within roller cones of the roller cone bit.

15. The system of claim 13, wherein the drill bit is a fixed cutter bit and the formation sensors are disposed within cutters of the fixed cutter bit.

16. The system of claim 13, wherein the drill bit is a hybrid bit comprising fixed cutters and roller cone structures, and the formation sensors are disposed within at least one of the fixed cutters, a body of the drill bit, an arm of the roller cone structures, or the roller cone structures.

17. The system of claim 1, wherein the formation sensors are centrally located on a drill bit of the downhole drilling system and operable to radially sense the formation information.

18. The system of claim 1, wherein the one or more instructions that, when executed by the processor, further cause the processor to select the depth in front of the downhole drilling system.

19. The system of claim 1, wherein the formation information includes information associated with one or more properties of the formation immediately in front of a drill bit of the downhole drilling system.

20. The system of claim 1, wherein the visualization includes an indication of a past trajectory of the wellbore.

21. The system of claim 20, wherein the past trajectory includes a past steering angle.

22. The system of claim 1, wherein the one or more instructions that, when executed by the processor, further cause the processor to determine a future trajectory of the wellbore using a target location in the formation, and the visualization includes an indication of the future trajectory of the wellbore.

23. The system of claim 22, wherein the future trajectory includes a future steering angle.

24. The system of claim 1, wherein the visualization includes an indication of a depth associated with the sensor data being visualized.

25. The system of claim 1, wherein the visualization includes a borehole diameter and a sensor sweep diameter.

26. The system of claim 1, wherein the visualization includes an animation of the sensor data over time.

27. The system of claim 1, wherein the one or more instructions that, when executed by the processor, further cause the processor to modify one or more aspects of the visualization based on input from an operator of the drilling system.

28. The system of claim 1, wherein the visualization is two dimensional.

29. The system of claim 1, wherein the visualization is three dimensional.

30. The system of claim 1, wherein the one or more instructions that, when executed by the processor, further cause the processor to update the visualization periodically.

31. A method for visualizing data from look-ahead sensors, comprising:
receiving formation information from each of a plurality of formation sensors coupled to a drill bit of a downhole drilling system, the formation information being associated with a variance of one or more properties of a formation azimuthally relative to a face of the drill bit at a depth ahead of the drill bit;
receiving angular information from one or more orientation sensors coupled to the downhole drilling system, the angular information being associated with the formation information, wherein the angular information tracks an angular position of each of the plurality of formation sensors while the drill bit rotates;
compiling sensor data based on the formation information and the angular information; and
generating a visualization based on the sensor data that comprises azimuth information, wherein the visualization includes an indication of at least one of actual formation dip angle, apparent formation dip angle and dip direction.

32. The method of claim 31, wherein compiling the sensor data comprises storing the sensor data into memory bins based on the angular information.

33. The method of claim 31, further comprising receiving radial information from the one or more orientation sensors, the radial information being associated with the formation information.

34. The method of claim 33, wherein compiling the sensor data is further based on the radial information.

35. The method of claim 34, wherein compiling the sensor data comprises storing the sensor data into memory bins based on the radial information and the angular information.

36. The method of claim 31, further comprising determining formation composition information based on the sensor data.

37. The method of claim 36, wherein the formation composition information is further based on survey measurement data.

38. The method of claim 36, wherein the visualization comprises an indication of the formation composition information.

39. The method of claim 31, wherein compiling the sensor data based on the formation information comprises interpolating sensor data.

40. The method of claim 31, wherein generating the visualization based on the sensor data comprises generating a smooth gradient by interpolating the sensor data.

41. The method of claim 31, wherein the formation sensors are gamma ray sensors, and compiling the sensor data comprises counting gamma rays detected by the gamma ray sensors over an angular range.

42. The method of claim 31, wherein the formation sensors are antennas, and compiling the sensor data comprises averaging the magnitudes of formation information received over an angular range.

43. The method of claim 31, wherein the formation sensors are radially-oriented on a drill bit of the downhole drilling system.

44. The method of claim 43, wherein the drill bit is a roller cone bit and the formation sensors are disposed within roller cones of the roller cone bit.

45. The method of claim 43, wherein the drill bit is a fixed cutter bit and the formation sensors are disposed within cutters of the fixed cutter bit.

46. The method of claim 43, wherein the drill bit is a hybrid bit comprising fixed cutters and roller cone structures, and the formation sensors are disposed within at least one of the fixed cutters, a body of the drill bit, an arm of the roller cone structures, or the roller cone structures.

47. The method of claim 31, wherein the formation sensors are centrally located on a drill bit of the downhole drilling system and operable to radially sense the formation information.

48. The method of claim 31, further comprising selecting the depth in front of the downhole drilling system.

49. The method of claim 31, wherein the formation information includes information associated with one or more properties of the formation immediately in front of a drill bit of the downhole drilling system.

50. The method of claim 31, wherein the visualization includes an indication of a past trajectory of the wellbore.

51. The method of claim 50, wherein the past trajectory includes a past steering angle.

52. The method of claim 31, further comprising determining a future trajectory of the wellbore using a target location in the formation, and the visualization includes an indication of the future trajectory of the wellbore.

53. The method of claim 52, wherein the future trajectory includes a future steering angle.

54. The method of claim 31, wherein the visualization includes an indication of a depth associated with the sensor data being visualized.

55. The method of claim 31, wherein the visualization includes a borehole diameter and a sensor sweep diameter.

56. The method of claim 31, wherein the visualization includes an animation of the sensor data over time.

57. The method of claim 31, further comprising modifying one or more aspects of the visualization based on input from an operator of the drilling system.

58. The method of claim 31, wherein the visualization is two dimensional.

59. The method of claim 31, wherein the visualization is three dimensional.

60. The method of claim 31, further comprising updating the visualization periodically.

61. A computer-readable medium comprising instructions that, when executed by a processor, cause the processor to:
receive formation information from each of a plurality of formation sensors coupled to a drill bit of a downhole drilling system, the formation information being associated with a variance of one or more measured properties of a formation azimuthally relative to a face of the drill bit at a depth ahead of the drill bit;
receive angular information from one or more orientation sensors coupled to the downhole drilling system, the angular information being associated with the formation information, wherein the angular information tracks an angular position of each of the plurality of formation sensors while the drill bit rotates;
compile sensor data based on the formation information and the angular information; and
generate a visualization based on the sensor data that comprises azimuth information, wherein the visualization includes an indication of at least one of actual formation dip angle, apparent formation dip angle and dip direction.

62. The computer-readable medium of claim 61, wherein compiling the sensor data comprises storing the sensor data into memory bins based on the angular information.

63. The computer-readable medium of claim 61, further comprising instructions that, when executed, cause the processor to receive radial information from the one or more orientation sensors, the radial information being associated with the formation information.

64. The computer-readable medium of claim 63, wherein compiling the sensor data is further based on the radial information.

65. The computer-readable medium of claim 64, wherein compiling the sensor data comprises storing the sensor data into memory bins based on the radial information and the angular information.

66. The computer-readable medium of claim 61, further comprising instructions that, when executed, cause the processor to determine formation composition information based on the sensor data.

67. The computer-readable medium of claim 66, wherein the formation composition information is further based on survey measurement data.

68. The computer-readable medium of claim 66, wherein the visualization comprises an indication of the formation composition information.

69. The computer-readable medium of claim 61, wherein compiling the sensor data based on the formation information comprises interpolating sensor data.

70. The computer-readable medium of claim 61, wherein generating the visualization based on the sensor data comprises generating a smooth gradient by interpolating the sensor data.

71. The computer-readable medium of claim 61, wherein the formation sensors are gamma ray sensors, and compiling the sensor data comprises counting gamma rays detected by the gamma ray sensors over an angular range.

72. The computer-readable medium of claim 61, wherein the formation sensors are antennas, and compiling the sensor data comprises averaging the magnitudes of formation information received over an angular range.

73. The computer-readable medium of claim 61, wherein the formation sensors are radially-oriented on a drill bit of the downhole drilling system.

74. The computer-readable medium of claim 73, wherein the drill bit is a roller cone bit and the formation sensors are disposed within roller cones of the roller cone bit.

75. The computer-readable medium of claim 73, wherein the drill bit is a fixed cutter bit and the formation sensors are disposed within cutters of the fixed cutter bit.

76. The computer-readable medium of claim 73, wherein the drill bit is a hybrid bit comprising fixed cutters and roller cone structures, and the formation sensors are disposed within at least one of the fixed cutters, a body of the drill bit, an arm of the roller cone structures, or the roller cone structures.

77. The computer-readable medium of claim 61, wherein the formation sensors are centrally located on a drill bit of the downhole drilling system and operable to radially sense the formation information.

78. The computer-readable medium of claim 61, further comprising instructions that, when executed, cause the processor to select the depth in front of the downhole drilling system.

79. The computer-readable medium of claim 61, wherein the formation information includes information associated with one or more properties of the formation immediately in front of a drill bit of one downhole drilling system.

80. The computer-readable medium of claim 61, wherein the visualization includes an indication of a past trajectory of the wellbore.

81. The computer-readable medium of claim 80, wherein the past trajectory includes a past steering angle.

82. The computer-readable medium of claim 61, further comprising instructions that, when executed, cause the processor to determine a future trajectory of the wellbore using a target location in the formation, and the visualization includes an indication of the future trajectory of the wellbore.

83. The computer-readable medium of claim 82, wherein the future trajectory includes a future steering angle.

84. The computer-readable medium of claim 61, wherein the visualization includes an indication of a depth associated with the sensor data being visualized.

85. The computer-readable medium of claim 61, wherein the visualization includes a borehole diameter and a sensor sweep diameter.

86. The computer-readable medium of claim 61, wherein the visualization includes an animation of the sensor data over time.

87. The computer-readable medium of claim 61, further comprising instructions that, when executed, cause the processor to modify one or more aspects of the visualization based on input from an operator of the drilling system.

88. The computer-readable medium of claim 61, wherein the visualization is two dimensional.

89. The computer-readable medium of claim 61, wherein the visualization is three dimensional.

90. The computer-readable medium of claim 61, further comprising instructions that, when executed, cause the processor to update the visualization periodically.

\* \* \* \* \*